United States Patent [19]

Stephens

[11] Patent Number: 4,650,049
[45] Date of Patent: Mar. 17, 1987

[54] CYCLE HUB CONVERTIBLE BETWEEN COASTER BRAKE AND FREEWHEELING OPERATION

[76] Inventor: Charles W. Stephens, 1296 Adair St., San Marino, Calif. 91108

[21] Appl. No.: 755,061

[22] Filed: Jul. 15, 1985

[51] Int. Cl.[4] .................... B62L 5/00; F16D 41/24
[52] U.S. Cl. .................................. 192/6 R; 192/64; 192/114 R
[58] Field of Search ............... 192/6 R, 46, 64, 114 R, 192/6 A; 188/24.17; 301/105 B

[56] References Cited

U.S. PATENT DOCUMENTS

| | | | |
|---|---|---|---|
| 952,041 | 3/1910 | Hancock | 192/6 R |
| 1,135,883 | 4/1915 | Elkin | 192/6 R |
| 3,203,519 | 8/1965 | Schwerdhofer | 192/6 R |

FOREIGN PATENT DOCUMENTS 20174 of 1900 United Kingdom ................ 192/64

Primary Examiner—Rodney H. Bonck
Attorney, Agent, or Firm—Donald D. Mon

[57] ABSTRACT

A cycle hub is shown which can be converted between coaster brake and freewheeling operation without removal from the cycle. A unidirectional clutch is interposed between a hub sprocket and a coaster brake drive, coupling them for forward driving. It can selectively be disabled to prevent freewheeling or be enabled to permit it. When the clutch is disabled, the coaster brake hub operates conventionally.

4 Claims, 2 Drawing Figures

CYCLE HUB CONVERTIBLE BETWEEN COASTER BRAKE AND FREEWHEELING OPERATION

FIELD OF THE INVENTION

This invention relates to cycle hubs, and in particular to a hub which is readily convertible between coaster brake and freewheeling operation.

BACKGROUND OF THE INVENTION

Trick riding on cycles, especially bicycles, is becoming increasingly popular in sport and competition activities. There are two types of cycle hubs, and each is more amenable to certain kinds of tricks than the other. In fact, certain tricks can be done on one but not on the other type.

One type of hub is the coaster brake hub. In this device, forward rotation of the pedals drives a hub sprocket to propel the cycle forwardly. Because the pedals and the pedal sprocket are directly linked by a chain to a hub sprocket, the hub sprocket movements will be understood to be the same as those of the pedals in both types. In the coaster brake hub, forward driving of the hub sprocket drives the hub shaft forwardly so the wheel propels the cycle forwardly. Rearward rotation of the hub sprocket is limited, because after a rearward rotation of only a few degrees, the coaster brake is applied, and the cycle is brought to a stop.

The freewheeling type also drives the hub shaft forwardly when the hub sprocket is rotated forwardly. However, rearward rotation of the hub sprocket, and therefore of the pedals is free and unrestrained. It is this action which is referred to herein as "freewheeling". No brakes are applied. In conventional freewheel cycles, the brakes are controlled by levers on the handle bars, and the brakes themselves are calipers which press against the wheel to brake its rotation.

These two types of hubs have inherently different properties with respect to various tricks. For example, for some tricks it is necessary to have the pedals at a particular orientation at the start of the trick. However, forward rotation moves the cycle, perhaps to an undesirable place, and with the coaster brake hub rearward rotation applies the brakes, which may be undesirable. The evident solution is to use a freewheeling hub for these tricks. But what if one owns only a cycle with a coaster brake?

The brute force solution to this quandary, which is common these days, is to own two cycles, each with a different hub, or to have one cycle with two different rear wheel assemblies, and to change wheels between tricks. These are troublesome and expensive solutions.

It is an object of this invention to provide an integral cycle hub which can readily be converted from freewheeling to coaster brake operation, and vice versa, without changing the wheel hub.

A cycle hub according to this invention has a hub sprocket driven by a chain that is linked to the pedal assembly. The hub includes a coaster brake, and a coaster brake drive adapted always to propel the cycle forwardly when the drive is turned forwardly, and to apply the brake when it is turned rearwardly. A unidirectional clutch is interposed between the hub sprocket and the coaster brake drive. In the freewheeling operation, the clutch is permitted to operate in its standard mode, namely to propel the cycle when the pedal assembly is driven forwardly and to freewheel rearwardly, both relative to the coaster brake drive.

To convert the hub to the coaster brake mode, the clutch is disabled in the sense that it can no longer permit freewheeling in one direction effectively joining the hub sprocket arm coaster brake drive so that the hub sprocket directly drives the coaster brake drive in both directions. In the preferred embodiment, this is accomplished by interconnecting two relatively rotatable parts of the clutch.

The above and other features of this invention will be fully understood from the following detailed description and the accompanying drawings, in which:

DETAILED DESCRIPTION OF THE INVENTION

Figure 1:
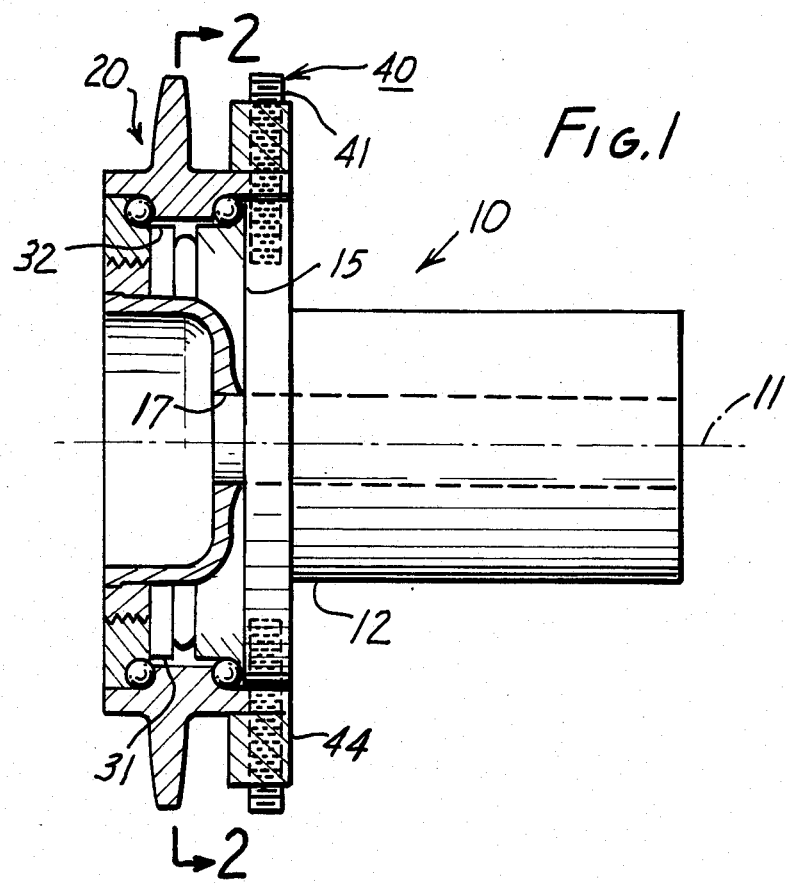
FIG. 1 is a side view, partly in cross-section, showing the presently-preferred embodiment of the invention.

FIG. 1 shows a cycle hub 10 having an axis of rotation 11. A wheel (not shown) is mounted to and is driven by the hub, rotating around axis 11. A coaster brake hub 12 is shown schematically, because the details of its construction are conventional. The function is to drive the wheel when the pedals are turned at a rate faster than the rate of rotation of the wheel, allowing for the ratio between their rotational velocities. When the cycle is moving and the pedals are stopped, the coaster brake freewheels and allows the cycle to coast. When the pedal rotation is reversed, an internal brake is applied.

The coaster brake hub includes a coaster brake drive 15. In the Figs. it is a disc-like member 16, connected to a central shaft 17. Rotation of drive 15 in one direction or the other accomplishes the coaster brake hub action described above.

A hub sprocket 20 is rotatably mounted to coaster-brake drive 15. It has external sprocket teeth 21 to engage a chain (not shown), which is drivingly connected to the pedal assembly. As in all freewheeling devices, an overrunning clutch (sometimes called a "unidirectional clutch") 30 is placed inside the hub sprocket. Conventionally it has an inner race 31, and outer race 32, and a plurality of pawls 33 and 34. In the illustrated construction, the inner race is part of, or integral with the coaster brake drive, and the outer race is part of, or integral with the hub sprocket. When the clutch is free to operate, driving the outer race counter clockwise causes driving engagement. Driving it clockwise causes ratcheting or freewheeling. By the term "driving" is meant the effort to turn one race faster than the other is turning.

To convert the system to coaster brake operation, conversion means 40 (sometimes called "disabling means") in the form of screws 41 are threaded into the hub sprocket, and can be turned so their inner ends enter a respective recess 42 and abut a base 43. Conveniently, but not necessarily, a lock ring 44 is provided in which the screws remain threaded in both modes, and the screws then are moved into or out of aligned holes in the two races. Equally well, the screws could be threaded directly into the hub sprocket and extend into the coaster brake hub. When the screw is removed from the recess, the engagement of the coaster brake drive to the coaster brake hub is that of the freewheeling type.

No reverse rotation then reaches the coaster brake drive, because it is not transmitted by the clutch. The clutch is said to be "disabled".

Figure 2:
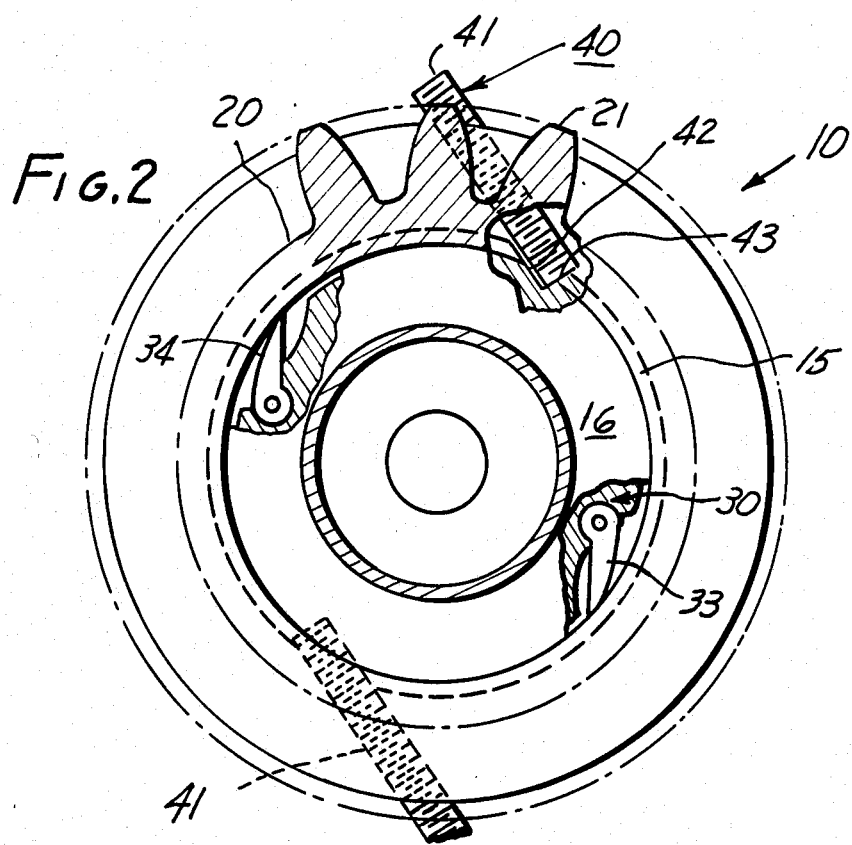
FIG. 2 is a cross-section taken at line 2—2 in FIG. 1.

When the screws are threaded in as shown, forward drive is conventional, but rearward freewheeling is frustrated, because the screws prevent counterclockwise rotation of the inner race (as seen in FIG. 2) relative to the outer race. Thus, rearward rotation of the hub sprocket is transmitted to the coaster brake drive to cause the hub to operate in the coaster brake mode.

Other means selectively to disable the clutch can be provided, as can other types of clutches.

This invention provides a convenient and inexpensive means to enable a single hub to be operated in a freewheeling or in a coaster brake mode.

This invention is not to be limited to the embodiment shown in the drawings and described in the description, which is given by way of example and not of limitation, but only in accordance with the scope of the appended claims.

I claim:

1. A cycle hub selectively convertible to a coaster brake mode or to a freewheeling mode without removal from its cycle, comprising:

a coaster brake hub;
    a coaster brake drive for driving said hub, said coaster brake drive being mounted for free rotation in a forward direction and limited rotation in a rearward direction;
    a hub sprocket;
    a unidirectional clutch interposed between said hub sprocket and said coaster brake drive which couples them for forward driving, and is adapted to permit said hub sprocket to rotate freely in the rearward direction for freewheeling; and
    disabling means selectively applicable to the clutch to prevent said freewheeling.

2. A cycle hub according to claim 1 in which said clutch has an inner and an outer race, and in which said disabling means comprises an element which prevents relative rotation of said races in the direction which represents freewheeling.

3. A cycle hub according to claim 2 in which said element is a screw threaded into one of said races and adapted to enter a recess in the other said race.

4. A cycle hub according to claim 3 in which said recess includes an abutment against which said screw bears in the freewheeling direction.

* * * * *